United States Patent [19]

Twort

[11] 4,402,345
[45] Sep. 6, 1983

[54] PRECAST FURNACE PIPE INSULATION

[75] Inventor: Thomas J. Twort, Greenford, England

[73] Assignees: Urquhart Engineering Co., Ltd., England; Bloom Eng. Co., Inc., Pa.

[21] Appl. No.: 343,120

[22] Filed: Jan. 27, 1982

[30] Foreign Application Priority Data

Feb. 4, 1980 [GB] United Kingdom ............... 8103403

[51] Int. Cl.³ .............................................. F27D 3/02
[52] U.S. Cl. .................................... 138/149; 432/234
[58] Field of Search ............. 138/103, 106, 110, 149, 138/96 T; 432/234; 24/248 E, 263 SW, 264, 268, 25

[56] References Cited

U.S. PATENT DOCUMENTS

| 809,327 | 1/1906 | Rieske | 24/25 |
| 3,376,056 | 4/1968 | Linstead | 24/268 |
| 3,881,864 | 5/1975 | Nicol | 138/149 |
| 4,362,506 | 12/1982 | Campbell | 138/149 |

FOREIGN PATENT DOCUMENTS

| 210647 | 2/1924 | United Kingdom | 138/99 |
| 1482623 | 8/1977 | United Kingdom | 432/234 |

Primary Examiner—John W. Shepperd
Attorney, Agent, or Firm—Webb, Burden, Robinson & Webb

[57] ABSTRACT

Pipe insulation means for installation around a pipe to cover at least part of the surface thereof comprises two elongate preformed insulating members each comprising a cast refractory insulating material. The two members are hingedly connected together at adjacent radial longitudinal faces, and a cast refractory wedge member is inserted into a wedging groove preformed in the said faces of the members radially outwardly of the hinge whereby the opposite longitudinal edges of the members are urged closer together as the wedge member is driven home into the groove to force the members against the surface of the pipe and cause them to grip the pipe so tightly that other means of fixing, and in particular welding is unnecessary.

7 Claims, 3 Drawing Figures

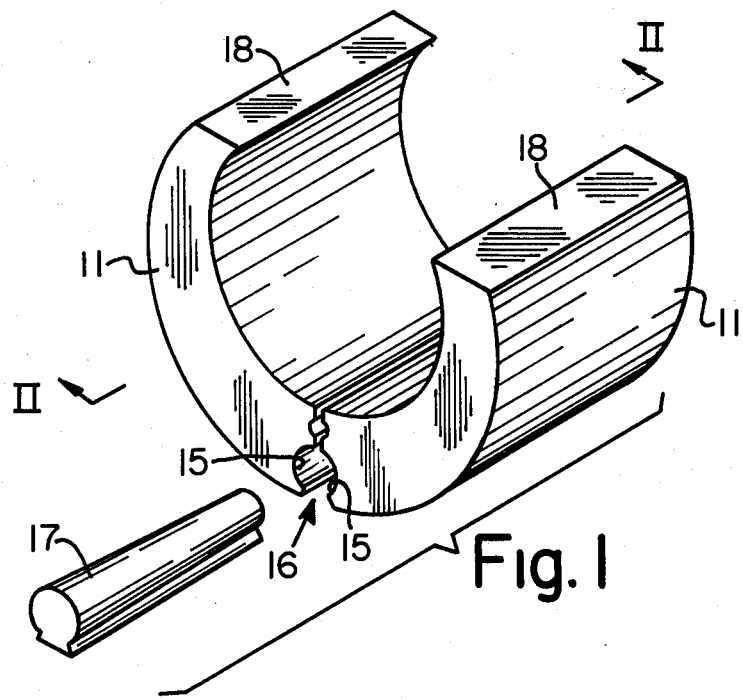
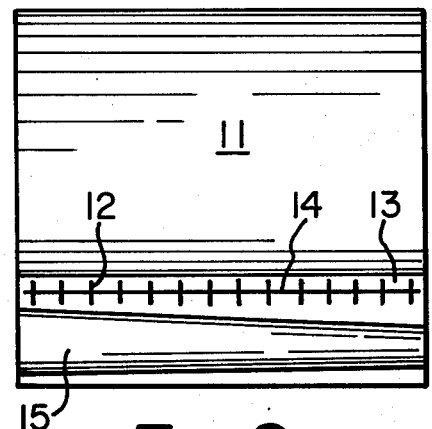
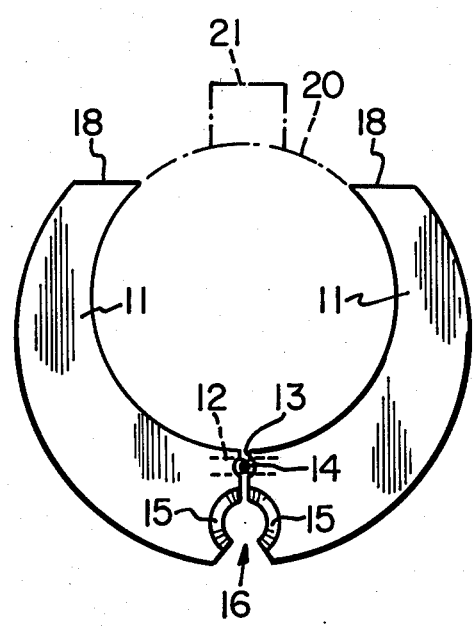

PRECAST FURNACE PIPE INSULATION

FIELD OF THE INVENTION

This invention relates to a means and method for insulating members mounted within high temperature furnace chambers, particularly water cooled pipes in the supporting structures for work pieces in heat treating furnaces.

BACKGROUND OF THE PRIOR ART

A supporting structure within a furnace chamber where temperatures may be in the order of 2000° F. must be compact in order to leave sufficient combustion space in the chamber, must be strong enough support heavy metal work pieces being treated in the furnace, and must be protected against injury by the high temperature within the furnace while at the same time not seriously interfering with the efficiency and maximum temperature of a furnace. It must also be strong enough to withstand the stresses and heavy vibration set up by the movement of the heavy workpieces within the heating chamber.

A combination of small size with high strength dictates the use of metals in the supports and the necessity for cooling the metal dictates the use of hollow metal pipes through which cooling water is circulated.

If water cooled pipes with bare outer surfaces are used, however, the absorption of heat through the pipe metal to the cooling water is so great that more fuel is wasted in heating the cooling water than in heating the work pieces. For example, an under fired furnace having bare metal supports in its lower zone requires about three times as much fuel to heat the lower zone of the furnace as the upper zone of the furnace, and no matter how much fuel is supplied to the lower zone it still remains distinctly cooler than the upper zone.

In an endeavour to correct this condition it has been proposed to apply refractory insulating material directly to the water cooled support pipes. However, this expedient has not proved very satisfactory because the refractory material tends to crack after some use, principally because of the difference in thermal expansion of the inner and the outer layers of the refractory materials and because of the difference in the thermal expansion characteristics of the refractory materials and the metal pipe which it encloses. The movement of the supporting structure due to the movement of the heavy work pieces within the heating chamber also contributes significantly to the break up and loss of the refractory material particularly after cracking has occurred.

It is therefore advantageous that the insulation be so constructed that if cracking of the refractory material does occur, movement of the piping does not result in the complete break-up and loss of the refractory material. It has been proposed that this be accomplished by embedding in the refractory material a reticulated metal structure such as a wire fabric comprising interlocking coils of wire extending parallel to each other and to the pipe axis to act as a reinforcement and support for the refractory material which, should damage to the refractory material occur, will hold the refractory material together and in situ round the piping thus preserving the heat insulation.

To facilitate the insulation of such an insulation on piping the insulation has conveniently been made in two or more preformed sections which are secured together circumferentially around the piping. For example, a two-section insulation has included a preformed semi-cylindrical refractory element having wire fabric embedded therein with portions of the wire protruding from the refractory material such that when the section is placed against the pipe the protruding wire portions are situated adjacent opposite sides of the pipe. The protruding portions of the wire are then welded to the pipe.

While the above form of insulation is capable of giving very satisfactory results, the need for welding the protruding portions of the wire to the pipe is time-consuming and costly.

OBJECT OF THE INVENTION

It is accordingly an object of the present invention to provide an improved pipe insulation which can be secured to the pipe without welding.

SUMMARY OF THE INVENTION

To do this the invention provides pipe insulation for installation around a pipe to cover at least part of the surface thereof, and which comprises two elongate preformed insulating members each comprising a refractory insulating material, means forming a hinge connection between the members, and means for wedging the members apart in the vicinity of the hinge connection to cause the members to grip the pipe between them.

In a particular embodiment the preformed refractory members each have the radial longitudinal face adjacent a radial longitudinal face of the other member, and the hinge connection is formed by a linking pin which hingedly connects the members together at the adjacent longitudinal faces. A recess is formed in the said face of each member extending generally parallel to and adjacent the linking pin, and the recesses co-operate to define a wedging groove. A wedge member is insertable into the groove to wedge the members apart about the linking pin as a fulcrum and thus urge the opposite, outer longitudinal edges of the members closer together and cause the members to grip the pipe between them.

Preferably the recesses are dimensioned so that the wedging groove has a sufficient width that, in the absence of the wedge, the members can be pivoted apart, about the linking pin, to open them out far enough for the pipe to pass radially between the opposite edges of the members. Thus to place the insulation around the pipe all that is required is to open it out and slip it radially onto the pipe. The insulation can be freely slid axially along the pipe when in this condition. When it is in the desired position, the wedge is driven home into the groove to force the members against the surface of the pipe and grip the pipe so tightly that other means of fixing, and in particular welding, is unnecessary.

The wedging groove is preferably tapered longitudinally of the insulation. The wedge is suitably a correspondingly tapered cast member of refractory insulating material, and may be of key-hole shape in transverse cross-section.

The preformed members preferably include a wire reinforcement embedded in the cast refractory insulating material. If loops of the wire fabric project from the adjacent radial longitudinal faces of the members, such loops can be arranged to interfit so that the hinge connection can be formed by inserting a wire linking pin longitudinally through the loops.

BRIEF DESCRIPTION OF THE DRAWINGS

An embodiment of the invention is illustrated by way of example in the accompanying drawings, of which:

FIG. 1 is a perspective view of a pipe insulation according to the invention prior to application to a pipe, the wedge being shown removed;

FIG. 2 is a longitudinal cross-section on the line II—II and

FIG. 3 is an end view of the pipe insulation applied to a water-cooled pipe in a furnace.

DESCRIPTION OF PREFERRED EMBODIMENT

Referring to the drawings, the pipe insulation 10 comprises two axially elongate preformed heat insulating members 11 each of arcuate form and hingedly connected together at the bottom, and a wedge member 17. Each member 11 comprises a cast refractory insulating material having embedded therein a reticulated wire reinforcement. The reinforcement includes wire loops 12, FIGS. 2 and 3, which project from the adjacent radial longitudinal faces 13 of the members 11. The loops projecting from each member interfit and the two members 11 are hingedly connected together by a linking pin in the form of a wire rod 14 inserted longitudinally through the loops 12. A recess 15 is provided in the longitudinal face 13 of each case member 11 below the rod 14 and the two recesses 15 co-operate to form a wedging groove 16 which extends longitudinally of the insulation 10 and is tapered from one end to the other. The wedge member 17 which is also a cast refractory insulating material is tapered longitudinally to coact with groove 16 as will be described.

Indicated in FIG. 3 is a water-cooled furnace pipe 20 having a skid bar 21 extending longitudinally of the pipe. To install the insulation 10 on the pipe, the members 11 are opened up around rod 14 and the insulation is slipped around the pipe. The recesses 15 are dimensioned so that groove 16 is of sufficient width that the members 11 can be opened up far enough for their opposite, outer longitudinal edges 18 to separate to a distance greater than the diameter of pipe 20.

With the insulation placed around the pipe in this manner, the wedge 17 is driven into the groove 16 to lock the insulation in position. The wedge 17, acting in conjunction with the fulcrum represented by rod 14, presses the members 11 towards each other and causes them to grip the pipe so tightly that welding is unnecessary. The wedge 17 is as shown of key-hole shape in transverse cross-section which prevents it loosening and dropping out when the insulation is subjected to stress and vibration in the operating environment of the furnace.

I claim:

1. Pipe insulation means for installation around a pipe to cover at least part of the surface thereof, which comprises two elongate preformed insulating members each comprising a refractory insulating material, means forming a hinge connection between the members, and means for wedging the members apart in the vicinity of the hinge connection to cause the members to grip the pipe between them.

2. Pipe insulation means according to claim 1, wherein said preformed refractory insulating members each has one radial longitudinal face adjacent a radial longitudinal face of the other member, and the hinge connection means comprises a linking pin which hingedly connects the members together at the said adjacent faces.

3. Pipe insulation means according to claim 2, wherein said preformed insulating members each comprise a cast refractory insulating material which has embedded therein a wire fabric reinforcement comprising loops projecting from the said adjacent radial longitudinal faces such that said loops of the two members interfit, and said linking pin comprises a wire pin inserted longitudinally through the interfitted loops.

4. Pipe insulation means according to claim 2, including a recess formed in the face of each said refractory member to extend generally parallel to and adjacent the linking pin, said recesses cooperating to define a wedging groove radially outwardly to said linking pin, and wherein said means for wedging the members apart comprises a wedge member insertable into the groove to urge the opposite longitudinal edges of the said members closer together and cause the said members to grip the pipe between them, said linking pin acting as a fulcrum.

5. Pipe insulation means according to claim 4, wherein said wedge member is of keyhole shape in transverse cross-section.

6. Pipe insulation means according to claim 4, wherein the said wedging groove is tapered longitudinally of the said insulating members, and the said wedge member is a correspondingly tapered member of cast refractory insulating material.

7. Pipe insulating means according to claim 1, wherein the means forming said hinge connection is dimensioned so that in the absence of the said wedge member the preformed insulating members can be pivoted apart about the said hinge connection to open them out sufficiently far for the pipe to pass radially between the opposite longitudinal edges of the said insulating members.

* * * * *